United States Patent [19]

Nakamura et al.

[11] Patent Number: 4,798,050

[45] Date of Patent: Jan. 17, 1989

[54] CONTROL SYSTEM FOR HYDRAULIC TANDEM PUMP IN MOTOR VEHICLE

[75] Inventors: Keiichi Nakamura; Tsuneo Tanaka; Yoshiharu Inaguma, all of Kariya; Harunori Shiratori, Toyota, all of Japan

[73] Assignees: Toyoda Koki Kabushiki Kaisha, Kariya; Toyota Jidosha Kabushiki Kaisha, Toyota, both of Japan

[21] Appl. No.: 60,525

[22] Filed: Jun. 11, 1987

[30] Foreign Application Priority Data

Jun. 11, 1986 [JP] Japan .............................. 61-88897[U]

[51] Int. Cl.[4] .............................................. F16D 31/00
[52] U.S. Cl. ........................................ 60/329; 60/428; 60/468; 91/419
[58] Field of Search ................. 60/468, 494, 486, 329, 60/428; 91/419; 417/310, 307, 281, 292

[56] References Cited

U.S. PATENT DOCUMENTS

| | | | |
|---|---|---|---|
| 3,664,129 | 5/1972 | Schwab | 91/419 X |
| 4,179,888 | 12/1979 | Goscenski | 60/468 X |
| 4,223,646 | 9/1980 | Kinder | 60/329 X |
| 4,414,809 | 11/1983 | Burris | 60/468 X |
| 4,570,849 | 2/1986 | Klaucke et al. | 91/419 X |

FOREIGN PATENT DOCUMENTS 49-40183 11/1974 Japan .
56-83630 7/1981 Japan .
58-13119 1/1983 Japan .

OTHER PUBLICATIONS

Technical Paper, "Hydraulic Fan Drive for Greater Vehicle Efficiency", by C. Kells Hall and Steve Claussen of Sundstrand Corp.

*Primary Examiner*—Edward K. Look
*Attorney, Agent, or Firm*—Oblon, Fisher, Spivak, McClelland & Maier

[57] ABSTRACT

A control system for a hydraulic tandem pump assembly including a primary pump for supplying fluid under pressure to a power-assisted steering device and a secondary pump for supplying fluid under pressure to a hydraulic motor of an engine cooling fan, which pumps are mounted on a common drive shaft for rotation therewith. The control system includes an electrically operated flow quantity control valve disposed within a communication passage between the secondary pump and the hydraulic motor to bypass fluid under pressure discharged from the secondary pump into an inlet passage connecting a fluid reservoir to the secondary pump, a temperature sensor arranged to detect an ambient temperature of a prime engine of the vehicle for producing therefrom an output signal indicative of the ambient temperature, and an electric control apparatus connected to the sensor to control an electric current applied to the control valve in response to the output signal from the sensor in such a manner that the control valve is conditioned to bypass a large part or the entirety of fluid under pressure discharged from the secondary pump into the inlet passage when the ambient temperature of the engine is below a predetermined value.

3 Claims, 4 Drawing Sheets

CONTROL SYSTEM FOR HYDRAULIC TANDEM PUMP IN MOTOR VEHICLE

BACKGROUND OF THE INVENTION

1. Field of the Invention

The present invention relates to a hydraulic tandem pump assembly adapted for use in motor vehicles, and more particularly to a control system for a hydraulic tandem pump assembly of the type which is adapted to supply fluid under pressure to a power-assisted steering device and to a hydraulic motor of an engine cooling fan.

2. Discussion of the Background

A conventional hydraulic tandem pump assembly of this kind includes a primary pump for the power-assisted steering device and a secondary pump for the hydraulic motor of the engine cooling fan, which pumps are mounted on a common drive shaft in drive connection to an output shaft of a prime engine of the vehicle. In operation, both the pumps are simultaneously driven by rotation of the common drive shaft to supply fluid under pressure therefrom to the power-assisted steering device and to the hydraulic motor, even in a cold season as well as in a warm season. In the cold season, the viscosity of hydraulic fluid increases to cause an increase of fluid resistance in pipe lines of the pumps. This results in an increase of internal pressure in the pumps, causing power loss of the prime engine. As the secondary pump has a large displacement capacity for supplying a sufficient amount of fluid under pressure to the hydraulic motor of the engine cooling fan, the power loss of the prime engine becomes large in operation of the hydraulic motor. When the power assisted-steering device is operated to steer the vehicle without driving, the pressure in the primary pump increases to render the entirety of the tandem pump assembly in a heavy loaded condition. In such a condition, there is a fear of causing jam of the pumps.

SUMMARY OF THE INVENTION

It is, therefore, a primary object of the present invention to provide a control system for the hydraulic tandem pump assembly capable of eliminating power loss of the prime engine caused by operation of the hydraulic motor of the engine cooling fan at a low temperature.

A secondary object of the present invention is to provide a control system for the hydraulic tandem pump assembly, having the above-described characteristics, capable of decreasing the load acting on the secondary pump in operation of the power-assisted steering device.

According to the present invention, the primary object is attained by providing a control system for the hydraulic tandem pump assembly which comprises an electrically operated flow quantity control valve disposed within a communication passage between the secondary pump and the hydraulic motor to bypass fluid under pressure discharged from the secondary pump to an inlet passage connecting a fluid reservoir to the secondary pump, a temperature sensor arranged to detect an ambient temperature of a prime engine of the vehicle for producing therefrom an output signal indicative of the ambient temperature, and an electric control apparatus connected to the temperature sensor to control an electric current applied to the flow quantity control valve in response to the output signal from the temperature sensor in such a manner that the flow quantity control valve is conditioned to bypass a large part or the entirety of fluid under pressure discharged from the secondary pump to the inlet passage when the ambient temperature of the engine is below a predetermined value and conditioned to decrease the bypass flow quantity of fluid in accordance with the rise of the ambient temperature of the engine higher than the predetermined value.

To attain the secondary object, the control system may be modified to include a pressure sensor arranged to detect hydraulic pressure applied to the power-assisted steering device from the primary pump for producing an output signal therefrom when subjected to the hydraulic pressure in excess of a predetermined value. In the modified control system, the electric control apparatus is further arranged to control the electric current applied to the flow quantity control valve in response to the output signal from the pressure sensor in such a manner that the flow quantity control valve is conditioned to bypass a large part or the entirety of fluid under pressure discharged from the secondary pump to the inlet passage in operation of the power-assisted steering device.

BRIEF DESCRIPTION OF THE DRAWINGS

Additional objects, features and advantages of the present invention will be readily appreciated by the following detailed description of preferred embodiments thereof when considered with reference to the accompanying drawings, in which.

DESCRIPTION OF THE PREFERRED EMBODIMENTS

Figure 1:
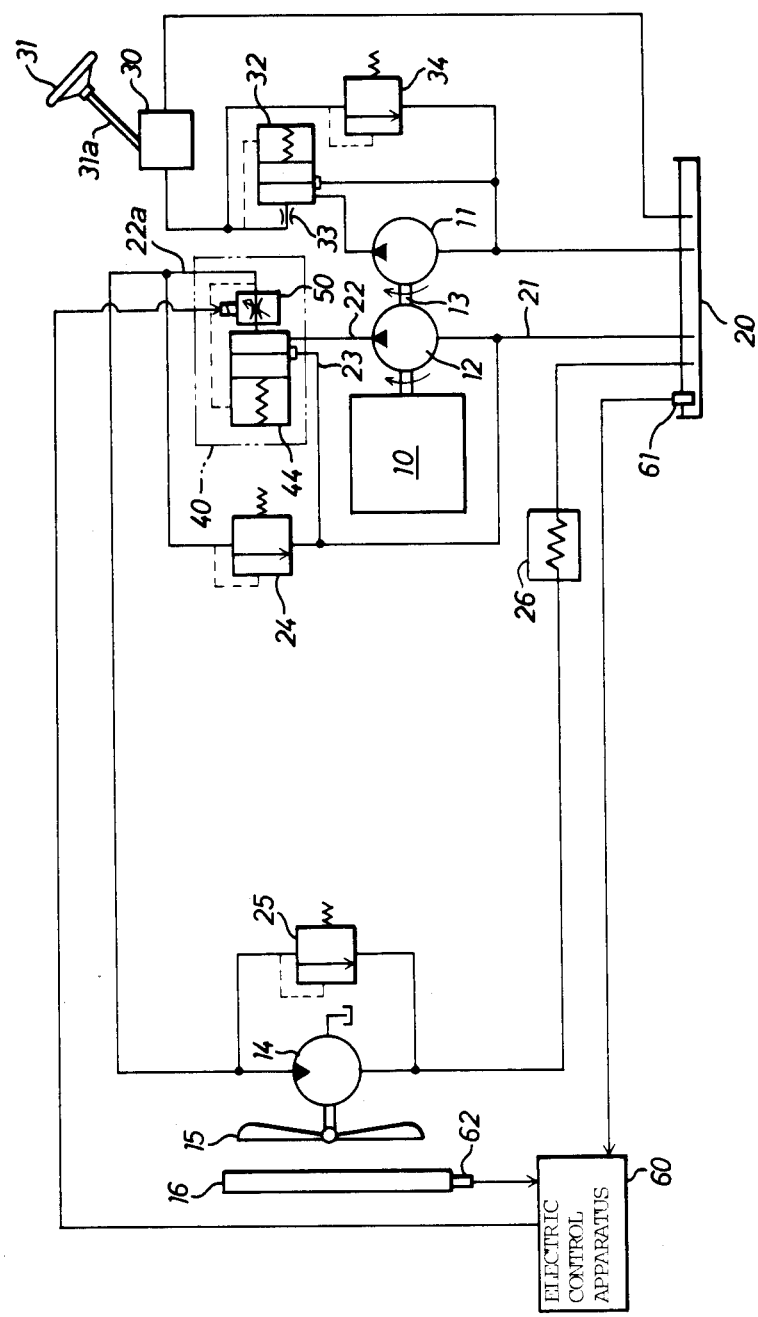
FIG. 1 is a schematic illustration of a control system for a hydraulic tandem pump assembly in a motor vehicle.

Referring now to the drawings, a hydraulic tandem pump assembly shown in FIG. 1 includes a primary pump 11 for supplying fluid under pressure to a power-assisted steering device 30 and a secondary pump 12 for supplying fluid under pressure to a hydraulic motor 14 of an engine cooling fan 15. The pumps 11 and 12 are mounted on a common drive shaft 13 in drive connection to a prime engine 10 of a motor vehicle to be driven simultaneously in operation of the engine 10.

The primary pump 11 is in the form of a vane pump which has an inlet port connected to a fluid reservoir 20 through an inlet passage and an outlet port connected to the power-assisted steering device 30 through a flow quantity control valve 32 and a fixed throttle 33. The power-assisted steering device 30 is arranged to be operated by a steering wheel 31 through a steering shaft 31a. In operation, fluid under pressure is supplied to the power-assisted steering device 30 under control of the flow quantity control valve 32 and returned to the fluid reservoir 20. The quantity of fluid under pressure discharged from the primary pump 11 increases in accordance with an increase of rotational speed of the prime engine 10. The flow quantity control valve 32 cooperates with the fixed throttle 33 to bypass an excessive quantity of fluid to the inlet passage of pump 11 so as to maintain the supply quantity of fluid under pressure to the power-assisted steering device 30 in a predetermined amount. A relief valve 34 is arranged to release an excessive hydraulic pressure applied to the power-assisted steering device 30 at the downstream of throttle 33.

The secondary pump 12 is also in the form of a vane pump which has an inlet port connected to the fluid reservoir 20 through an inlet passage 21 and an outlet port connected to the hydraulic motor 14 through passages 22 and 22a. The hydraulic motor 14 is connected to the fluid reservoir 20 through an oil cooler 26. Disposed within the passages 22 and 22a is an electrically operated flow quantity control valve assembly 40 which is activated under control of an electric control apparatus 60 as will be described in detail later. The engine cooling fan 15 is arranged behind a radiator 16 of the water cooling type and is drivingly connected to the hydraulic motor 14. A relief valve 25 is connected in parallel with the hydraulic motor 14 to bypass therethrough an excessive quantity of fluid under pressure to the fluid reservoir 20 thereby to define a maximum rotational number of motor 14. The passage 22a is connected to the inlet passage 21 through a relief valve 24 which is arranged to release an excessive hydraulic pressure at the downstream of the secondary pump 12.

Figure 2:
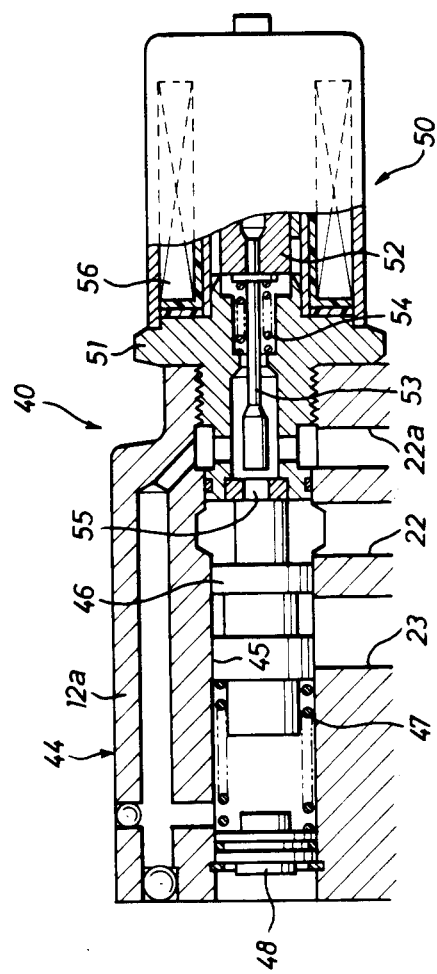
FIG. 2 is a sectional view of an electrically operated flow quantity control valve assembly adapted to the control system shown in FIG. 1.

As shown clearly in FIG. 2, the flow quantity control valve assembly 40 includes an electrically operated throttle valve 50 for controlling the opening degree of a throttle element 55 between the passages 22 and 22a and a flow control valve 44 associated with the throttle valve 50 to be operated in accordance with a difference in pressure between the passages 22 and 22a. The throttle valve 50 includes a support member 51 threaded into a housing 12a of the tandem pump assembly in a fluid-tight manner, a movable spool 52 in a sleeve fixed to the support member 51, a valve rod 53 carried by the movable spool 52 for movement therewith, and a solenoid winding 56 arranged in surrounding relationship with the movable spool 52 and mounted in place on the sleeve. The movable spool 52 is biased by a coil spring 54 rightwards in the figure to normally open the throttle element 55. When the solenoid winding 56 is energized by an electric current applied thereto, the movable spool 52 is moved leftwards against the coil spring 54 in accordance with the applied electric current so that the valve rod 53 approaches the throttle element 55 to decrease the opening degree of the same.

The flow control valve 44 includes a stepped valve spool 46 which is axially movably disposed within a bore 45 in the pump housing 12a and exposed at opposite ends thereof to the pressures in passages 22 and 22a. The valve spool 46 is biased by a compression coil spring 47 toward the throttle element 55 for abutment therewith to normally close fluid communication between the passages 22 and 22a and between the discharge passage 22 and a bypass passage 23. The bore 45 is closed by a plug 48 which is retained in place in the pump housing 12a to receive the coil spring 47 thereon. When applied with fluid under pressure from the secondary pump 12 through the discharge passage 22, the valve spool 46 is moved by the difference in pressure between passages 22 and 22a against the coil spring 47 to open the throttle element 55 for fluid communication between the passages 22 and 22a. In such operation, the discharge passage 22 is communicated with the bypass passage 23 in accordance with the axial movement of valve spool 46 to bypass therethrough a portion of the fluid under pressure into the inlet passage 21.

The bypass flow quantity of fluid into the inlet passage 21 decreases in a condition where the throttle valve 50 is fully opened and increases in accordance with a decrease of the opening degree of throttle valve 50. When the throttle valve 50 is fully closed, the entirety of fluid under pressure from discharge passage 22 flows into the inlet passage 21 through bypass passage 23. The pressure loss of fluid flowing into the inlet passage 21 can be minimized by appropriate determination of the opening area of throttle element 55 and the biasing force of spring 47. The bypass passage 23 is formed in the pump housing 12a in such a manner as to open into the inlet passage 21 at an appropriate angle. This is useful to supercharge the fluid sucked into the inlet passage 21 from reservoir 20 to enhance the suction efficiency of the secondary pump 12.

Figure 3:
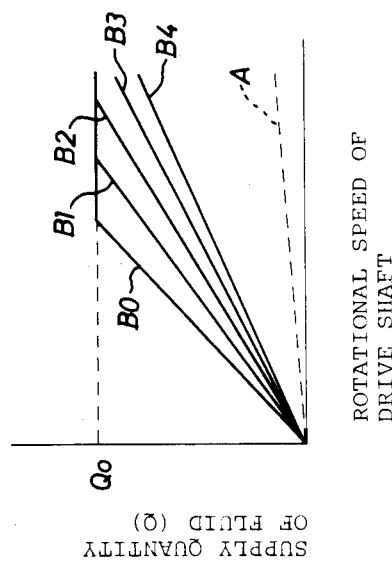
FIG. 3 is a graph showing an electric current applied to an electrically operated throttle valve associated with the flow quantity control valve assembly.

As shown in FIG. 1, the electric control apparatus 60 is connected at its input terminals to a fluid temperature sensor 61 disposed within the fluid reservoir 20 to detect the temperature of hydraulic fluid and to a water temperature sensor 62 disposed within the radiator 16 to detect the temperature of cooling water and is connected at its output terminal to the solenoid winding 56 of throttle valve 50. In this embodiment, the fluid temperature $T$ detected by sensor 61 represents an ambient temperature of prime engine 10, and the cooling water temperature $\underline{t}$ detected by sensor 62 represents a loaded condition of prime engine 10. The control apparatus 60 is arranged to control the electric current $\underline{i}$ applied to the solenoid winding 56 in dependence upon the fluid temperature $T$ and cooling water temperature $\underline{t}$ thereby to control the flow control valve 44. Namely, the control apparatus 60 is arranged to maintain the electric current $\underline{i}$ at a predetermined maximum level $\underline{iA}$ when the fluid temperature $T$ is below a predetermined valve $T_o$ (for instance, 85 C), as shown by a broken line $I_1$ in FIG. 3 and to control the electric current $\underline{i}$ in accordance with the cooling water temperature $\underline{t}$ when the fluid temperature $T$ exceeds the predetermined $\underline{T_o}$, as shown by a solid line $I_2$ in FIG. 3.

Figure 4:
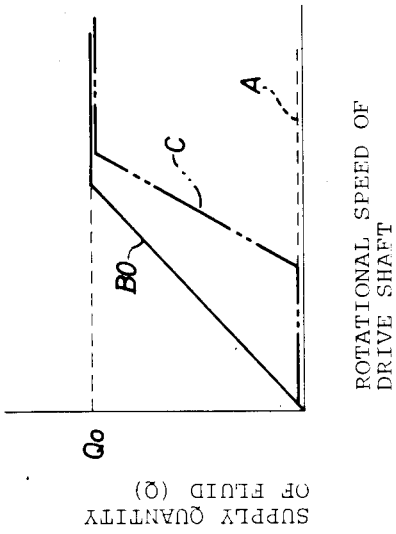
FIG. 4 is a graph showing an opening degree of the throttle valve in relation to a cooling water temperature.

Under such control of the control apparatus 60, the electric current $\underline{i}$ is maintained at the maximum level $\underline{iA}$ when the cooling water temperature $\underline{t}$ is lower than or equal to a value $t_1$, decreased in accordance with rise of the cooling water temperature $\underline{t}$ higher than the value $t_1$ and maintained at a minimum level $\underline{iB}$ when the cooling water temperature $\underline{t}$ is higher than a value $t_2$. In a practical embodiment, it is preferable that the values $t_1$ and $t_2$ are determined as 65 C and 95 C, respectively. As a result, the opening degree of throttle valve 50 is maintained at a minimum value $pA$ when the fluid temperature $T$ is lower than the predetermine value $\underline{T_o}$, as shown by a broken line $P_1$ in FIG. 4. When the fluid temperature T exceeds the predetermined value $T_o$, the opening degree of throttle valve 50 is maintained at the minimum value pA when the cooling water temperature $t$ is lower than the value $t_1$, increased in accordance with rise of the cooling water temperature $t$ higher than the value $t_1$ and maintained as a maximum value pB when the cooling water temperature $t$ is higher than the value $t_2$.

Figure 5:
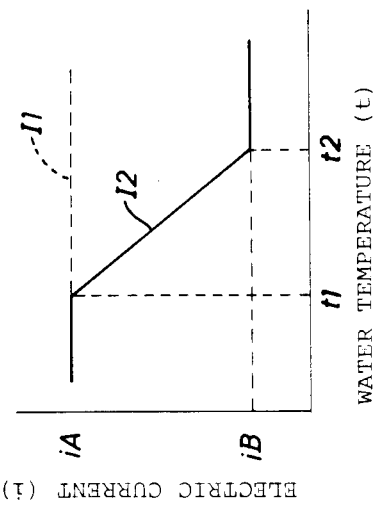
FIG. 5 is a graph showing a quantity of hydraulic fluid flowing through a hydraulic motor in the control system in relation to a rotational speed of the tandem pump.

When the opening degree of throttle valve 50 is maintained at the minimum value pA, the flow control valve 44 acts to return a large part of discharged fluid from pump 12 into the inlet passage 21 through bypass passage 23. In such a condition, as shown by a broken line A in FIG. 5, the supply quantity Q of fluid under pressure to the hydraulic motor 14 is gradually increased in accordance with an increase of the rotational speed of drive shaft 13. When the opening degree of throttle valve 50 is maintained at the maximum value pB, the flow quantity control valve 44 acts to decrease the quantity of discharged fluid flowing into the inlet passage 21 through bypass passage 23. In such a condition, as shown by a solid line $B_0$ in FIG. 5, the supply quantity Q of fluid under pressure to the hydraulic motor 14 is rapidly increased in accordance with an increase of the rotational speed of drive shaft 13.

When the supply quantity Q of fluid under pressure to the hydraulic motor 14 reaches a predetermined value $Q_o$, the relief valve 25 acts to bypass an excessive quantity of fluid therethrough to the fluid reservoir 20. When the opening degree of throttle valve 50 is between the minimum and maximum values pA and pB, the supply quantity D of fluid under pressure to the hydraulic motor 14 is increased in accordance with an increase of the rotational speed of drive shaft 13, as shown by sold lines $B_1$, $B_2$, $B_3$ and $B_4$ in FIG. 5. Thus, the hydraulic motor 14 is driven at a rotational speed proportional to the quantity Q of fluid under pressure supplied thereto to rotate the cooling fan 15 for cooling the water in radiator 16.

As is understood from the above description, when the ambient temperature of prime engine 10 is below the predetermined value $T_o$ to cause an increase of viscosity of the hydraulic fluid, the opening degree of throttle valve 50 is maintained at the minimum value pA so that the flow control valve 44 acts to bypass a large part of discharged fluid from pump 12 into the inlet passage 21 through bypass passage 23. As a result, only the remaining part of discharged fluid is supplied to the hydraulic motor 14 through passage 22a and returns to the fluid reservoir 20 through the oil cooler 26. This is effective to decrease loss of energy caused by fluid resistance in the pipe line between the passage 22a and the fluid reservoir 20 and to decrease the load acting on the secondary pump 12. When the viscosity of fluid increases at a low temperature, there is a fear of causing cavitation in the secondary pump 12 due to an increase of fluid resistance in the inlet passage 21. In such a condition, the discharged fluid from the secondary pump 12 is returned to the inlet passage 21 through bypass passage 23 to decrease the quantity of fluid sucked from the fluid reservoir 20. This is effective to eliminate cavitation in the secondary pump 12 caused by insufficient suction of fluid from the fluid reservoir 20. When the fluid temperature T rises higher than the predetermined value $T_o$, the fluid under pressure discharged from the secondary pump 12 is supplied to the hydraulic motor 14 in accordance with the cooling water temperature $t$ detected by sensor 62. Thus, the hydraulic motor 14 is driven by the fluid under pressure to rotate the cooling fan 15 at a speed proportional to rise of the cooling water temperature $t$.

Although in the control system, the throttle valve 50 has been arranged to remain a slight space for fluid communication in its fully closed position, it may be arranged to eliminate the slight space so as to render the supply quantity of fluid under pressure to the hydraulic motor 14 substantially zero.

Figure 7:
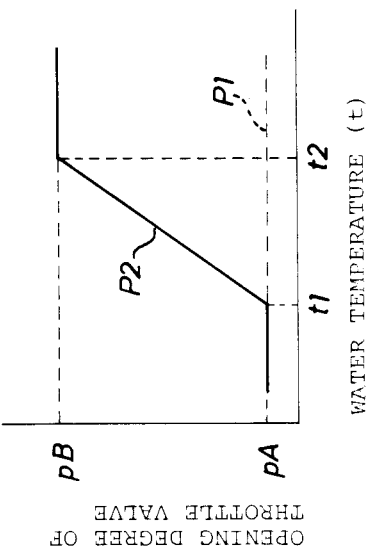
FIG. 7 is a graph showing a quantity of hydraulic fluid flowing through the hydraulic motor in the modified control system in relation to the rotational speed of the tandem pump.
Figure 6:
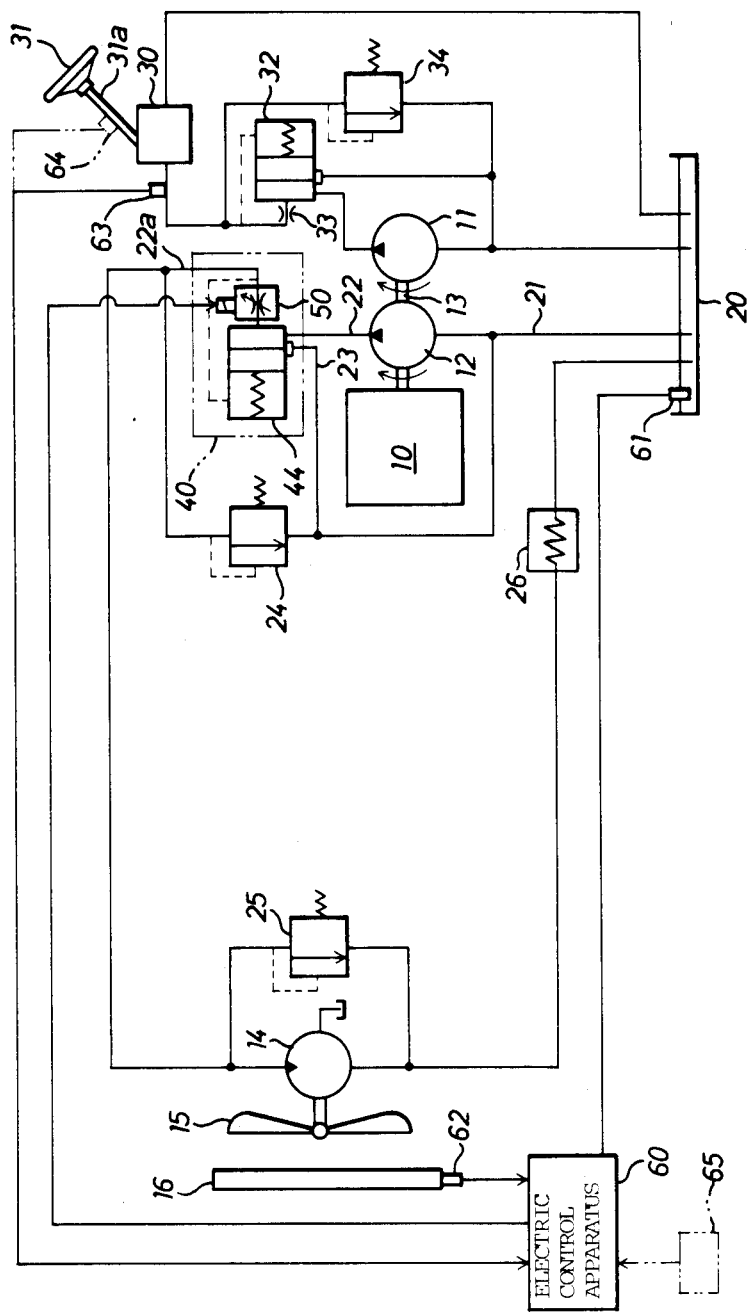
FIG. 6 illustrates a modification of the control system shown in FIG. 1.

In FIG. 6 there is illustrated a modification of the control system, wherein the electric control apparatus 60 is connected to a pressure sensor 63 which is arranged to detect hydraulic pressure in the inlet passage of the power-assisted steering device 30 for producing an output signal therefrom when subjected to the hydraulic pressure in excess of a predetermined value. In this modification, the electric control apparatus 60 is arranged to fully close the throttle valve 50 in response to the output signal from pressure sensor 63 so as to bypass the entirety of fluid under pressure discharged from the secondary pump 12 into the inlet passage 21 through bypass passage 23. With such arrangement of the control apparatus 60, the supply quantity of fluid under pressure to the hydraulic motor 14 is made substantially zero under control of the throttle valve 50 as shown by a broken line A in FIG. 7. This is effective to decrease the load acting on the secondary pump 12 when the power-assisted steering device 30 is operated to steer the vehicle without driving. As a result, a peak value of load acting on the tandem pump is temporarily decreased in operation of the power-assisted steering device 30 without causing any problem in cooling of the engine.

In another modification of the control system, the pressure sensor 63 may be replaced with a steering angle sensor 64 which is arranged to detect operating condition of the power assisted steering device 30 for producing an output signal therefrom when the steering wheel 31 is steered in a predetermined angle. In this modification, the electric control apparatus 60 is arranged to fully close the throttle valve 50 in response to the output signal from steering angle sensor 64 so as to bypass the entirety of fluid under pressure discharged from the secondary pump 12 into the inlet passage 21 through bypass passage 23. Furthermore, the electric control apparatus 60 may be connected to a speed sensor 65 which is arranged to detect the rotational speed of engine 10 (or drive shaft 13) for producing therefrom an output signal indicative of the rotational speed of engine 10. In this modification, the electric control apparatus 60 is arranged to increase the supply quantity of fluid under pressure to the hydraulic motor 14 in accordance with an increase of the rotational speed of engine 10 during operation of the power-assisted steering device 30, as shown by a dot and dash line C in FIG. 7.

Having now fully set forth both structure and operation of preferred embodiments of the concept underlying the present invention, various other embodiments as well as certain variations and modifications of the embodiments herein shown and described will obviously occur to those skilled in the art upon becoming familiar with the underlying concept. It is to be understood, therefore, that within the scope of the appended claims, the invention may be practiced otherwise than as specifically set forth herein.

What is claimed is:

1. A control system for a hydraulic tandem pump assembly adapted for use in a motor vehicle, said tandem pump assembly including a primary pump for supplying fluid under pressure to a power-assisted steering device and a secondary pump for supplying fluid under pressure to a hydraulic motor of an engine cooling fan, which pumps are mounted on a common drive shaft for rotation therewith, wherein the control system comprises:

an electrically operated flow quantity control valve disposed within a communication passage between said secondary pump and said hydraulic motor to bypass fluid under pressure discharged from said secondary pump into an inlet passage connecting a fluid reservoir to said secondary pump;

a first temperature sensor arranged to detect the temperature of hydraulic fluid stored in said fluid reservoir for producing therefrom an output signal indicative of the fluid temperature;

a second temperature sensor arranged to detect the temperature of cooling water flowing through a radiator of a prime engine of the vehicle for producing therefrom an output signal indicative of the cooling water temperature; and an electric control apparatus connected to said first and second temperature sensors to control an electric current applied to said flow quantity control valve in dependence upon values of the output signals from said temperature sensors in such a manner that said flow quantity control valve is conditioned to bypass a large part or the entirety of fluid under pressure discharged from said secondary pump into said inlet passage when the fluid temperature and the cooling water temperature are respectively below a predetermined value and conditioned to decrease the bypass flow quantity of fluid in accordance with rise of the fluid temperature and cooling water temperature higher than the predetermined value.

2. A control system for a hydraulic tandem pump assembly as recited in claim 1, wherein the control system further comprises a pressure sensor arranged to detect hydraulic pressure applied to said power-assisted steering device from said primary pump for producing an output signal therefrom when subjected to the hydraulic pressure in excess of a predetermined value, and wherein said electric control apparatus is further arranged to control the electric current applied to said flow quantity control valve in response to the output signal from said pressure sensor in such a manner that said flow quantity control valve is conditioned to bypass a large part or the entirety of fluid under pressure discharged from said secondary pump into said inlet passage in operation of said power-assisted steering device.

3. A control system for a hydraulic tandem pump assembly as recited in claim 1, wherein the control system further comprises a steering angle sensor arranged to detect operating condition of said power-assisted steering device for producing an output signal therefrom when a steering wheel is steered in a predetermined angle, and wherein said electric control apparatus is further arranged to control the electric current applied to said flow quantity control valve in response to the output signal from said steering angle sensor in such a manner that said flow quantity control valve is conditioned to bypass a large part or the entirety of fluid under pressure discharged from said secondary pump into said inlet passage in operation of said power-assisted steering device.

* * * * *